US012494111B2

(12) United States Patent
Verstraeten

(10) Patent No.: US 12,494,111 B2
(45) Date of Patent: Dec. 9, 2025

(54) PUSHER AMUSEMENT DEVICE WITH PIVOTING ARM AND GAME PIECE PROPULSION FEATURE

(71) Applicant: Elaut USA, Inc., Lake Worth, FL (US)

(72) Inventor: Eric Verstraeten, Sint Niklaas (BE)

(73) Assignee: Elaut N.V., Sint-Niklaas (BE)

( * ) Notice: Subject to any disclaimer, the term of this patent is extended or adjusted under 35 U.S.C. 154(b) by 820 days.

(21) Appl. No.: 17/838,121

(22) Filed: Jun. 10, 2022

(65) Prior Publication Data

US 2023/0061253 A1 Mar. 2, 2023

Related U.S. Application Data

(60) Provisional application No. 63/239,708, filed on Sep. 1, 2021.

(51) Int. Cl.
*G07F 17/32* (2006.01)
*A63F 11/00* (2006.01)

(52) U.S. Cl.
CPC ...... *G07F 17/3297* (2013.01); *A63F 11/0025* (2013.01); *A63F 2250/136* (2013.01)

(58) Field of Classification Search
None
See application file for complete search history.

(56) References Cited

U.S. PATENT DOCUMENTS 5,342,049 A * 8/1994 Wichinsky .......... G07F 17/3244 273/121 A
5,752,699 A * 5/1998 Crompton ........... G07F 17/3297 273/138.2
5,899,455 A * 5/1999 Crompton ........... G07F 17/3297 273/138.3
2003/0020234 A1* 1/2003 Jordan ................ G07F 17/3297 273/138.3
2006/0199648 A1* 9/2006 Mitchell ............. G07F 17/3216 463/47
2020/0223456 A1* 7/2020 Roy ...................... B61B 11/002

FOREIGN PATENT DOCUMENTS

GB 2293774 * 5/1994 ......... G07F 17/3297

OTHER PUBLICATIONS

Foreign reference GB2293774 (Year: 1994).*

* cited by examiner

*Primary Examiner* — Jason T Yen
(74) *Attorney, Agent, or Firm* — Andrew C. Aitken

(57) ABSTRACT

A pusher-type amusement machine that includes a motorized coin track assembly for the introduction of coins that has an track end that sweeps across a playfield and includes a base, a coin hopper for collection and ejecting coins and a track that extends from the coin hopper to a track end opening and a control switch to activate the hopper to push coins through the track so that they are ejected from the end of the track towards a playfield on the machine.

14 Claims, 9 Drawing Sheets

PUSHER AMUSEMENT DEVICE WITH PIVOTING ARM AND GAME PIECE PROPULSION FEATURE

CROSS REFERENCE TO RELATED APPLICATIONS

The Applicant claims the benefit of the filing date of U.S. Application No. 63/239,708 that was filed on Sep. 1, 2021.

BACKGROUND OF THE INVENTION

Field of the Invention

The present invention relates to an amusement machine of the pusher type in which a plurality of playing pieces such as coins, tokens or chips are used for game play.

Description of Related Art

Pusher amusement machines are well known and include conventional arrangements that use coins, tokens or chips that are introduced to a playfield, and which are paid out to a player as well embodiments that include other prizes. In some embodiments, the coins or chips circulate in a closed loop in the machine and are reintroduced into the game by means of hoppers. Such amusement machines are, for example are described in EP 0 755 033 and EP 3 21 298. Many of the conventional pusher games use gravity fed devices to introduce coins to the playfield surfaces over which a pushing element reciprocally moves over the playfield surface to engage coins on the surface and move them toward a ledge. Coins or prizes that fall from the ledge are awarded to the player though an access area.

SUMMARY OF THE INVENTION

The present invention is directed to pusher-type amusement machines with new features that allow for the exercise of skill. In a first embodiment, the amusement machine comprises a playing surface, a playing piece pusher and a game piece transport system that allows players to propel game pieces from a track positioned above the playfield toward the playfield surface using the game piece transport system. The game piece transport system that includes a coin hopper and spring assisted release device. A plurality of playing pieces, such as coins, chips or tokens are supported on the playfield surface which may be engaged by a pusher element that is powered by a motor and configured for reciprocating motion and which moves across the playfield surface and engages playing pieces in its path.

As the pusher element engages playing pieces it causes them to move toward a horizontal front edge of the playfield and to engage other pieces on the playfield surface which may result in pieces dropping over the front edge. Pieces that drop over the front edge are directed to the player or, alternatively, detected and counted, and a credit is given to the player. In embodiments, a game piece transport system uses a collection hopper for collecting playing pieces that have dropped over the front edge and directs the pieces into an elongate upright track for reintroduction to the game. A hopper motor pushes coins into a lower opening of the track which in turn push adjacent coins along the length of the track. The track originates at the hopper device located in a cabinet at the base of the device, extends vertically, and then turns in a substantially horizontal direction toward the playfield. In an embodiment, the track and hopper are attached to a base that is attached to a motor that provides pivotal motion to the entire assembly, causing the end of the track that is positioned above the playfield to sweep back and forth across the playfield. The track assembly is moved by a linkage to a rotating wheel and cam arrangement provided inside of the cabinet to provide movement to the coin track assembly causing the coin track to sweep back and forth. In an embodiment the distal end of the coin track is provided with a spring-controlled retainer device that, when in a first position, holds the game pieces within the track. When the hopper motor pushes coins into the bottom of the track a sufficient force is imposed on the chain of adjacent coins and, ultimately to the coin at the end of the track, which pushes against the retainer device to raise the end of a retainer bar on a retainer device out of a first position that blocks the path of the track, and thereby allows the release of the coin from the end of the track. As the retainer bar returns to the first position it again blocks the track, and, as the spring pulls the retainer bar back to a home position, it exerts a force on the rear of a coin in the track and propels the coin into the air toward the playfield.

In embodiments, a player can time the loading of game pieces into the track by operation of a switch that activates the hopper motor, and thereby can control the timing of the release of game pieces from the end of the track as it swings across the playfield. In embodiments, the game piece transport system is configured to reintroduce game pieces that drop from the ledge back to the playing surface though a chute that leads to the game piece hopper and track. Providing a pivoting game piece transport system as disclosed allows a player to time the release of one or more game pieces and provides a player with control over the direction where the game piece is released. It also provides a pleasing effect of shooting or propelling the game pieces into the air toward their intended location.

In an embodiment, the transport system is configured to circulate coins or tokens in a closed loop wherein all of the coins are maintained in the machine. When coins drop over the ledge, they are counted by a coin detector and players are provided with a commensurate reward, which may be in the form of tickets, a credit chit or electronic credits. Rewards earned during play can optionally be shown on a display screen of the machine along with other game machine status information. In other embodiments coins or tokens may be distributed to a player at a player access location.

BRIEF DESCRIPTION OF THE DRAWINGS

The present invention will be further elucidated on the basis of an exemplary embodiment with reference to the accompanying drawings, in which.

DETAILED DESCRIPTION

Figure 1:
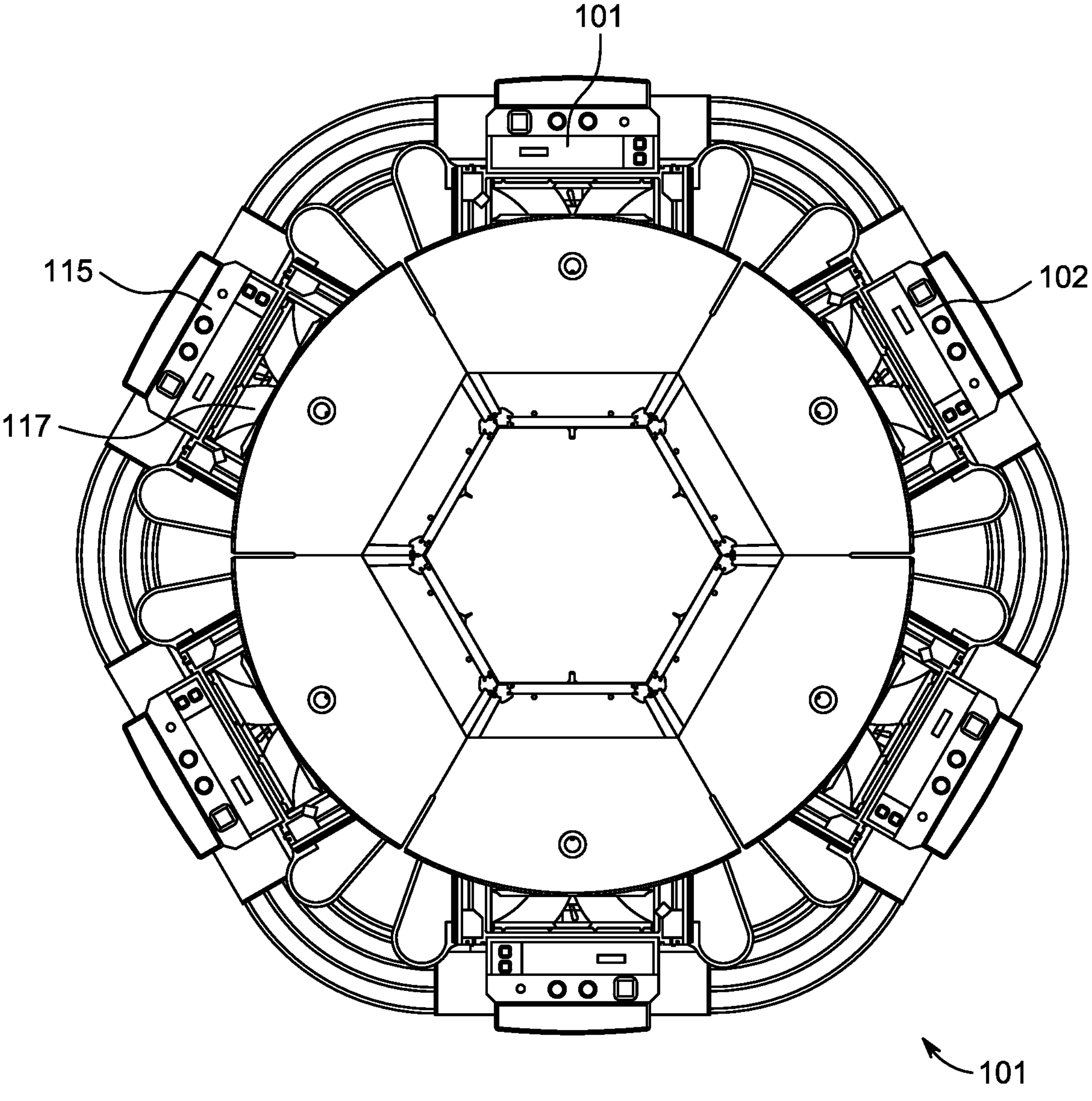
FIG. 1 is a top view of a multi-player pusher device according to the invention having six separate play locations.
Figure 2:
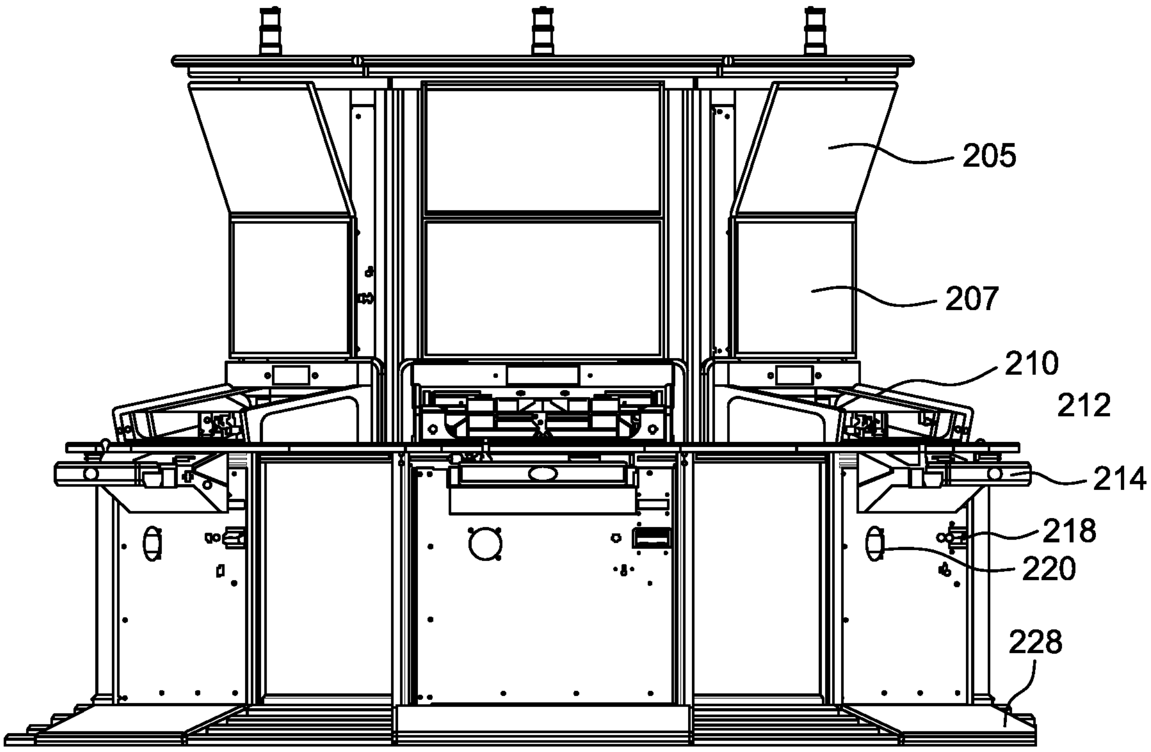
FIG. 2 is a side view in elevation of the device of FIG. 1.

Now referring to FIG. 1, a pusher type game machine 101 is provided that has a plurality of player stations such as station 101 and 102 that are positions around a central axis. As seen in FIG. 2 the machine includes display screens 205 and 207, a playfield section enclosed by transparent panels 210 and 211, and a player control console 214. Below control console 214 is access panel 218 on which a credit detector 218 and credit dispenser 220 are provided. A sturdy base member 228 provides stability to the device and mitigates tampering with the device.

Figure 3:
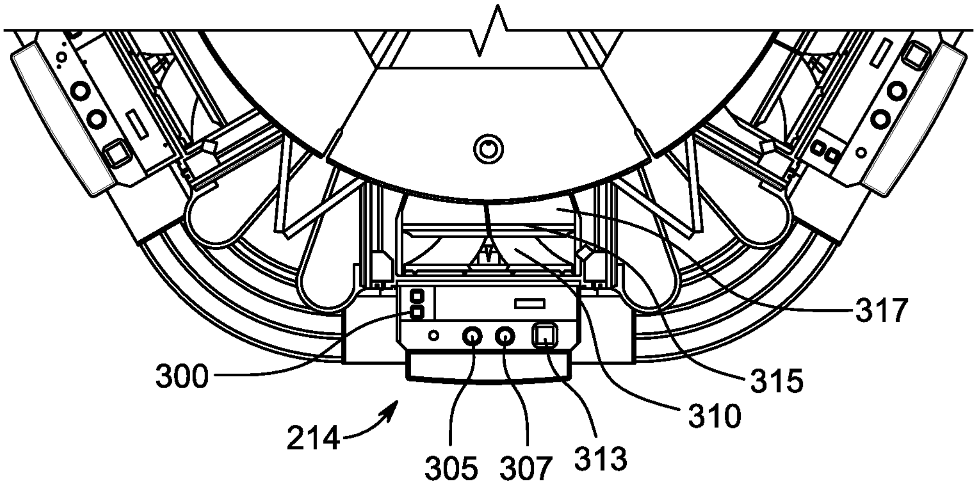
FIG. 3 is a top enlarged view of a portion of FIG. 1 showing the top surface of one of the playfields and player controls.

Referring now to FIG. 3, player control console 214 includes a credit activation button 300 for the initiation of play, a horizontal arm control stop button 305, a pusher stop button 307 and trigger control button 313. Also seen in FIG. 3 is the hopper entrance 310 and ledge 315 of playfield 317 on which coins, tokens or game pieces are received. As used herein the terms coins, tokens or playing pieces are used interchangeably, wherein games pieces may include an RFID tag.

Figure 4:
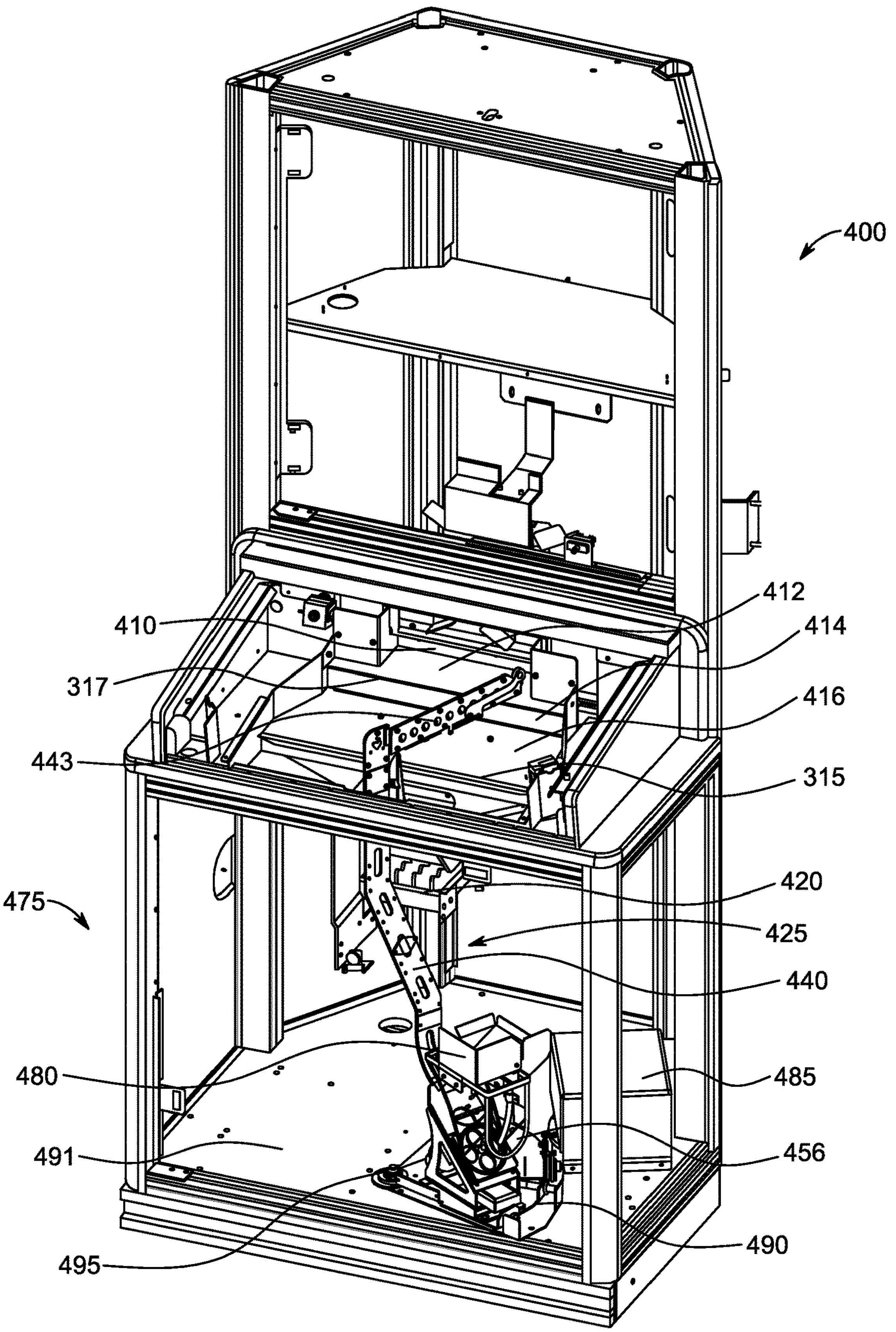
FIG. 4 is a perspective view of a single station of a pusher device according to an embodiment of the invention.

FIG. 4 depicts the components of play station 400 and includes pusher elements 410 and 414, which are substantially vertical walls that move along playfields 412 and 416 and engage coins or game pieces that rest on the respective playfields. As pushing element 410 moves across playfield 412 coins or other game pieces may be pushed off ledge 317 to playfield 416. Coins and other game pieces on playfield 416 are pushed by pusher element 414 and may fall over ledge 315 to a diverter 420. Diverter 420 routes coins to coin hopper opening 480 through a chute (not shown) or to a separate reservoir accessible to the machine owner or separates coins from different game pieces that are reintroduced to the game through a separate transport assembly (not shown). In embodiments, additional ledges and diverter paths may be provided that segregate coins for the machine owner which are known in the art. Coin transport assembly 425 is provided in lower cabinet 475 which includes hopper device 456, upright track section 440, and horizontal track section 443. The track which is made up of lower section 440 and upper section 443 is defined by four sidewalls that form a rectangle. The track has two opposite end walls that have a dimension slightly larger than the width of the coin or token used and two opposite sidewalls that are slight longer than the diameter of the coin or token. A coin introduced at the bottom of the track by the hopper will be pushed along the track by subsequent coins loaded into the track by the hopper. Lights may also be provided along the track which are actuated when play is initiated. In operation, coins that are directed to hopper are loaded into the bottom of the upright track section 440 by hopper 456. Coins loaded into the bottom of the track thereby push coins within the track along its length until they are released from the end of horizontal track section 443.

Figure 10:
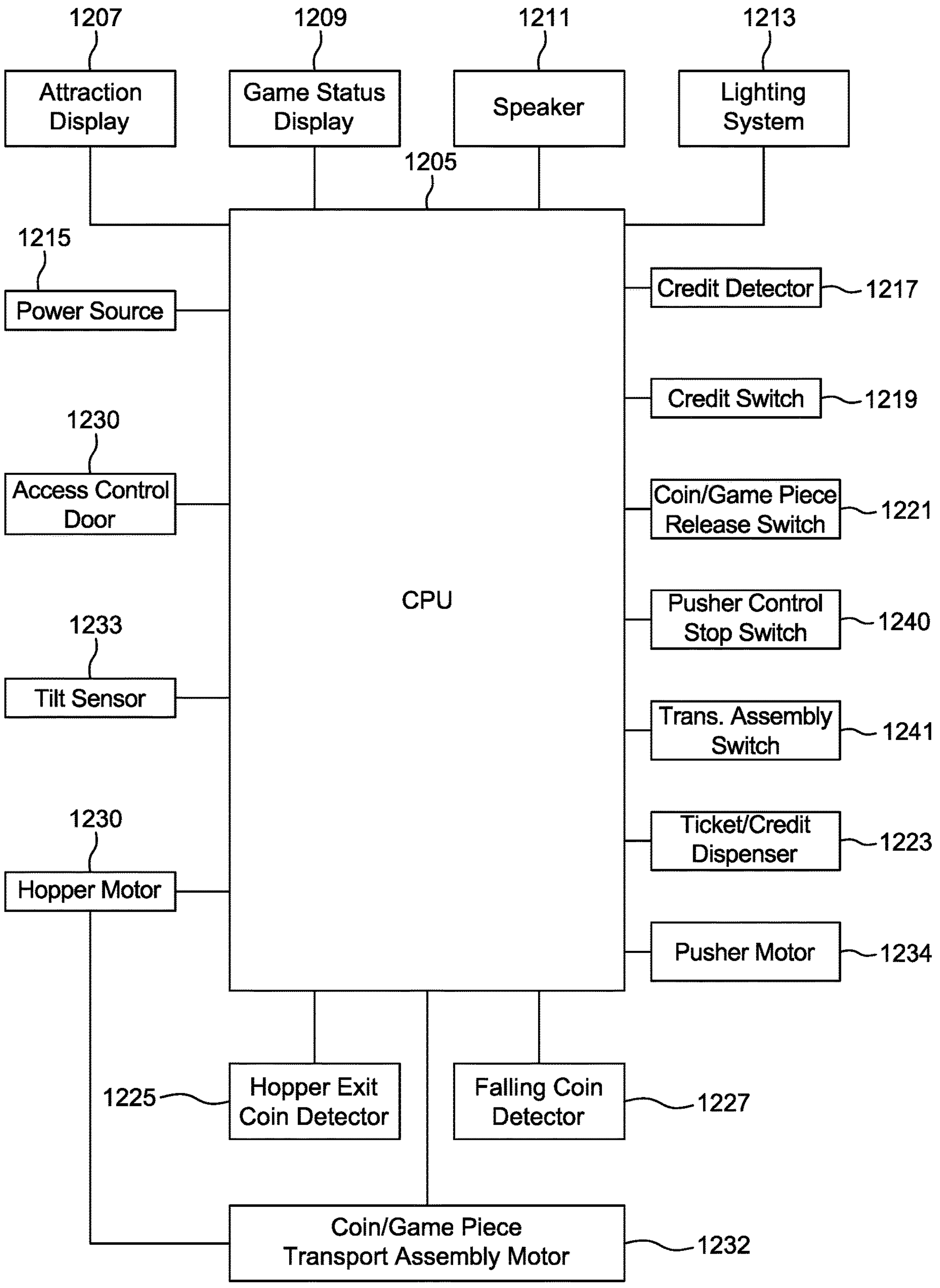
FIG. 10 is a block diagram of the circuit of an exemplary embodiment of the device.

In an exemplary embodiment, the coin transport assembly 425 comprises a rotary hopper that is configured collect coins and eject the coins in an orderly row into the coin track. Horizontal track section 443 track extends laterally from vertical section 440 and above the playing surfaces 416 and 412 that receive game pieces. In embodiments the end of the track is adjacent to the playfield and the coins ejected are directed to the playfield. In yet a further embodiment the end of the track may be lower than the and the force imposed on the coins propels them into the air towards the playfield. Transport assembly 425 is mounted on base 490 that is attached to floor 491 of lower cabinet 475 to allow for pivotable motion about axis 495. The pivotal motion of the transport assembly 425 is established by a cam mechanism and powered by motor 485. As the transport assembly 425 pivots, distal end of track section 443 swings back and forth across the top playing surface 412 in an arc. In embodiments, the player can stop the arm rotation at a selected location by engaging a transport assembly switch 1241 as shown in FIG. 10. In other embodiments, a player can stop the movement of the vertical pusher surfaces by activation of a pusher stop switch 1240. The activation and deactivation of the motors in response to the stop switches is controlled by the CPU and, for example, may only be permitted once after a coin has been introduced. Providing such player control provides skill elements to the game.

Figure 5:
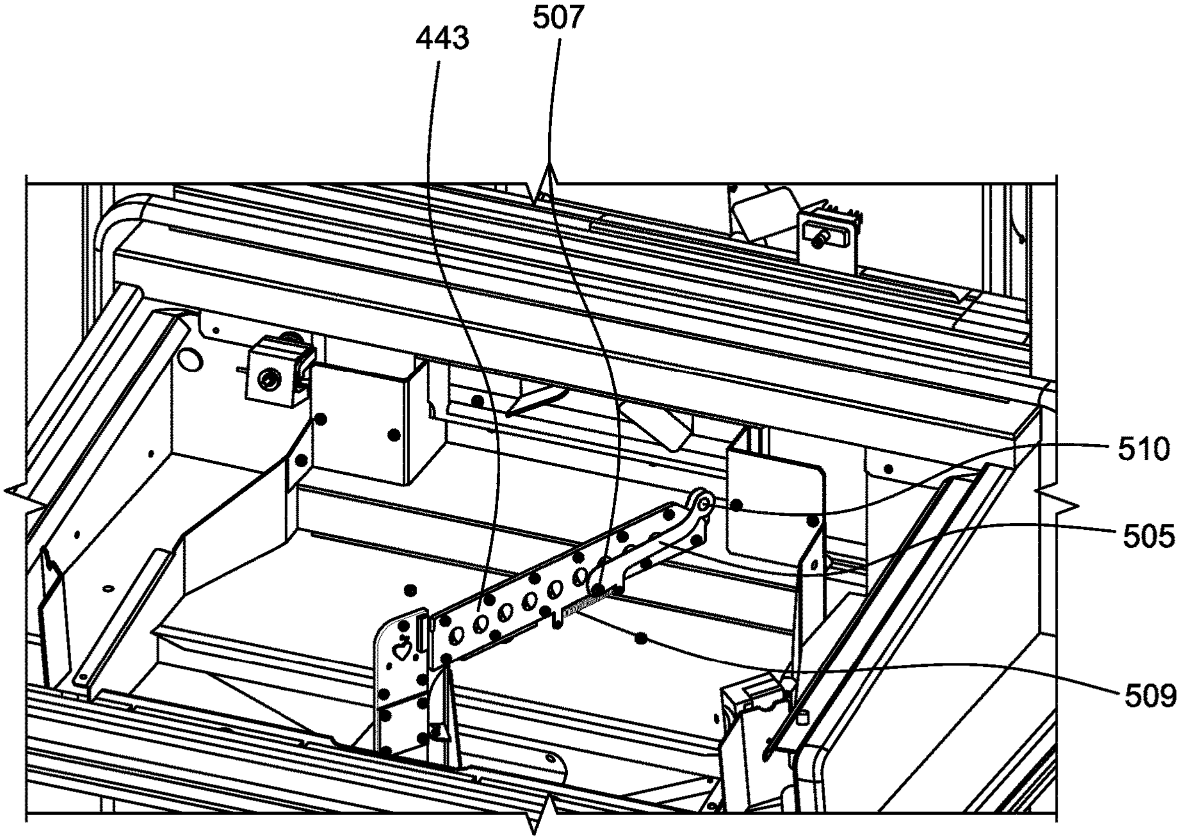
FIG. 5 is a perspective view depicting a horizontal arm section of the game piece track extending over the pusher playfields.

Referring now to FIG. 5, horizontal track section or arm 443 is depicted in place above the playfield surfaces. The coin track that includes arm 443 defines a channel that is sized and shaped to hold a single coin, token or similar shaped game piece. As coins are loaded into the bottom end of the track adjacent coins are pushed through the track. At the end of horizontal section 443 is spring biased retainer element 505 that holds coins in the track until sufficient force is exerted on the coin from adjacent coins which causes the retainer element 505 to pivot at axis 507 and rise upward, thereby displacing stop member 510 and allowing for the release of a coin. After a coin is released, spring 509 pulls the retainer element 505 back to a home position and, as stop member 510 snaps back, it propels the coin from the coin track.

Figure 6:
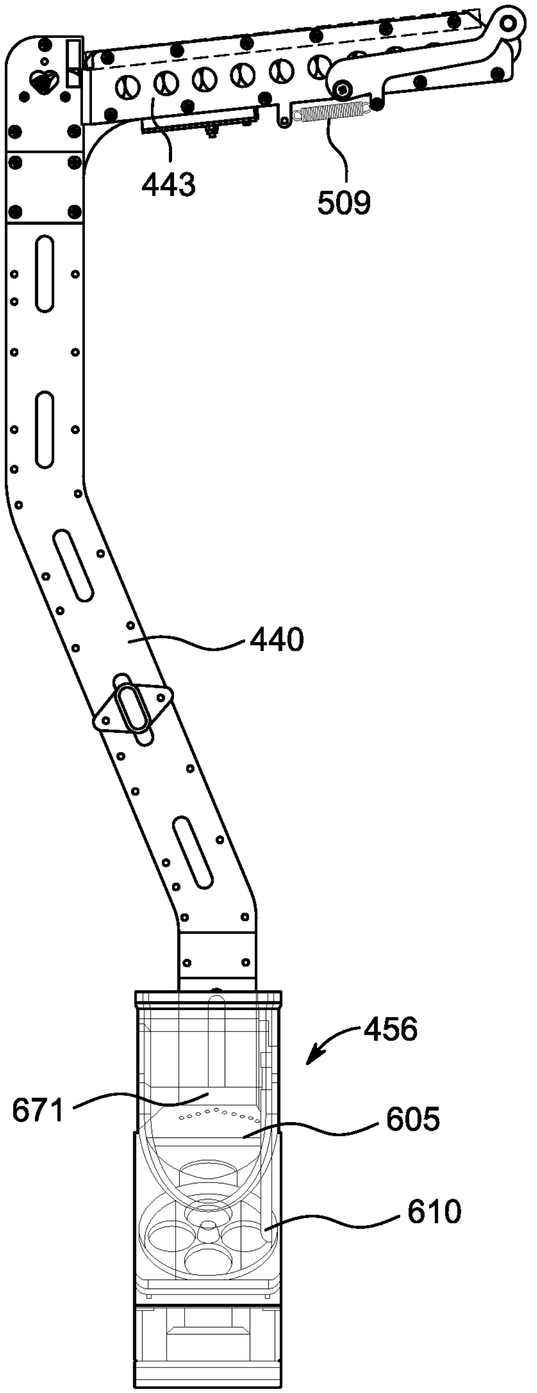
FIG. 6 is a front view in elevation of the game piece transport assembly including a coin track and coin hopper assembly.

As shown in FIG. 6, hopper 456 includes a collection part 605 and rotor 610 that is powered by a motor. Coins that are collected by part 605 are directed to rotor 610 that aligns the coins and, using small stubs (not shown) that extend from the rotor surface, propel the coins into a lower opening of the track 440. As coins pass the from the hopper to the track opening (not shown) they pass by a detector 671 and a signal is generated and then transmitted to a central processing unit which determines a count of the coins that pass into the track.

Figure 7:
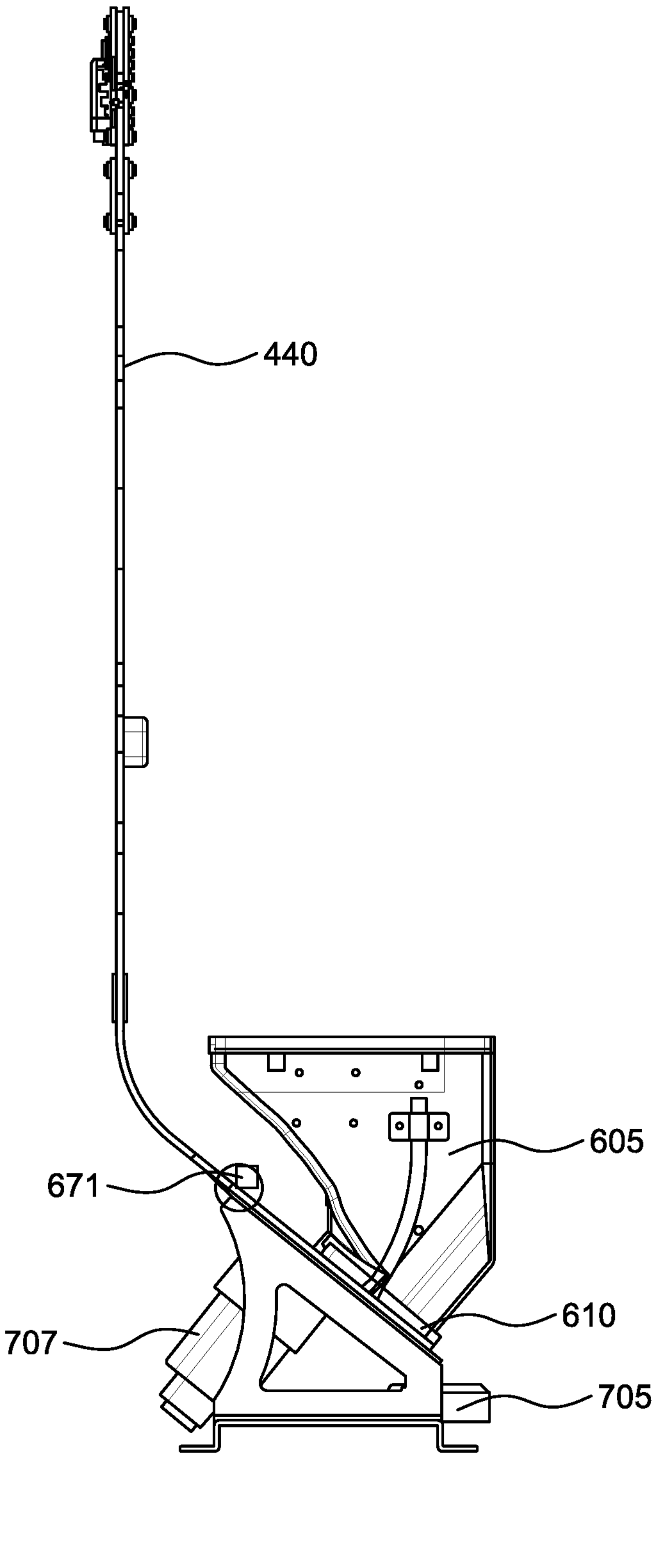
FIG. 7 is a side view in elevation of the coin transport device including a coin track and coin hopper assembly.

FIG. 7 depicts motor 707 that powers hopper rotor disk 610 which may be controlled by a player to shoot one or more coins toward the playfield. The hopper is mounted on bracket 705 that is attached to the pivotable base member 490.

Figure 8:
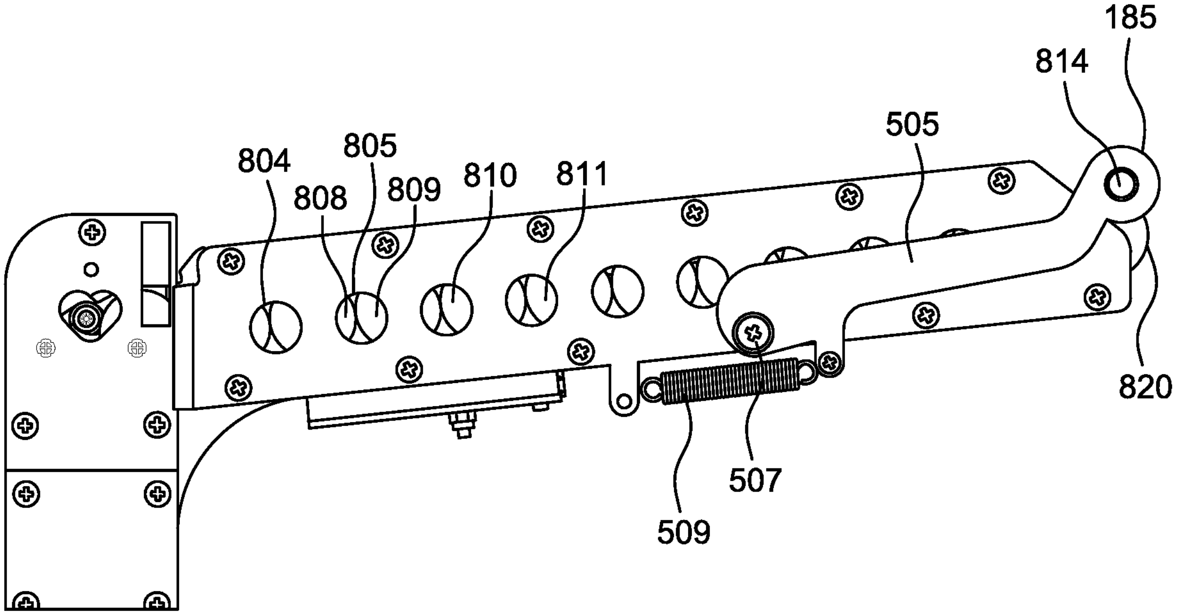
FIG. 8 is an enlarged side view in elevation of the horizontal portion of a coin track section of the coin transport assembly.

As best can be seen in FIG. 8, the horizontal track section 443 has windows, such as windows 804 and 805, that allow for the inspection of coins as they move through the track, such as coins 808, 89, 810 and 811. As depicted in FIG. 8, coin 820 is in the process of being ejected from the track end and retainer element 505 is shown partially raised from its home or closed position. Retainer element 505 has a pin 814 that connects the distal ends of opposite sides of the retainer stop element 185 and will prevent coins from passing when the retainer element is in the home position.

Figure 9:
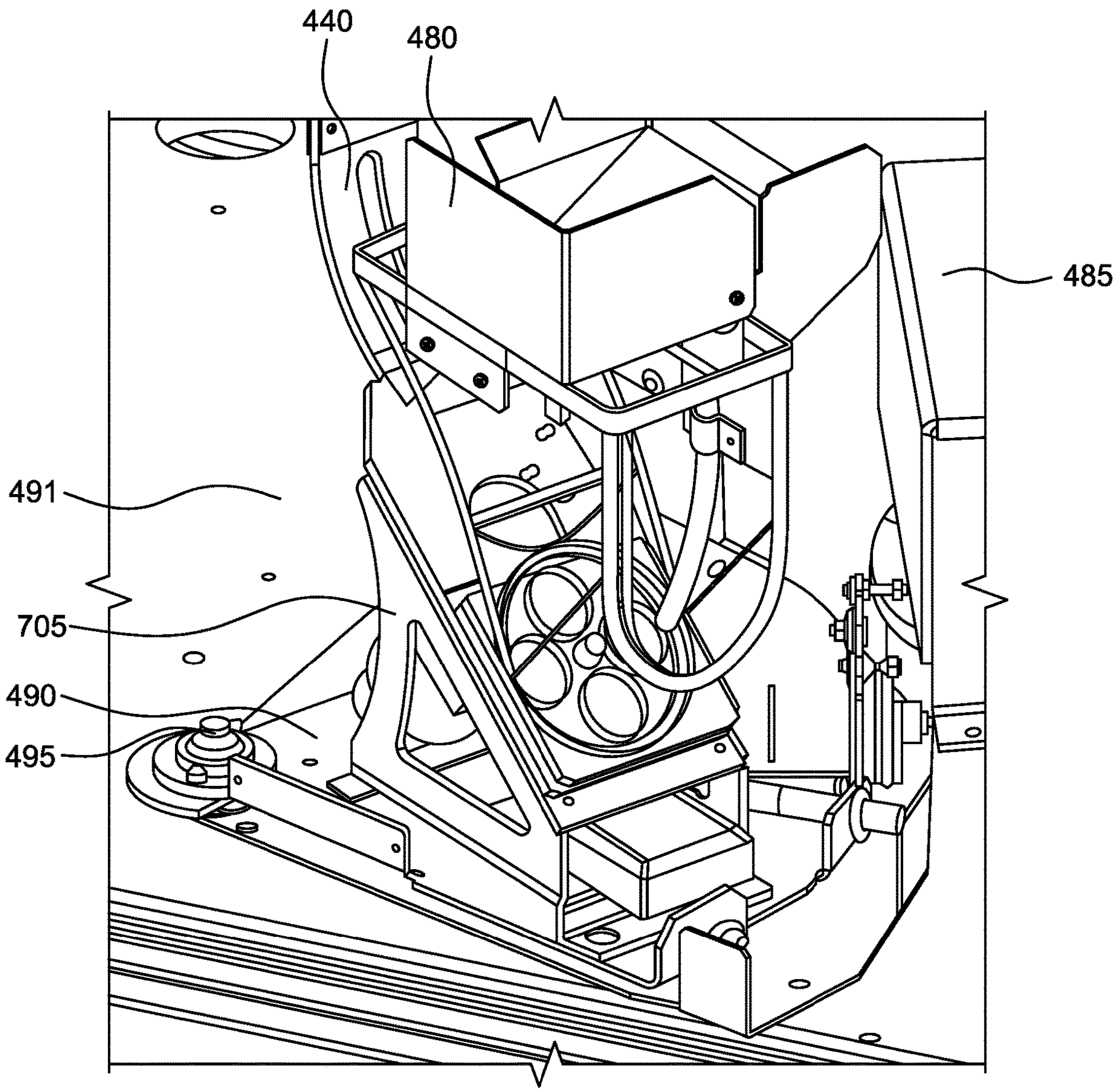
FIG. 9 is an enlarged perspective view of the hopper device position in the base of a pusher game device.

FIG. 9 is an enlarged view of the lower section of coin transport assembly 425 and depicts its configuration on the floor 491 of the lower cabinet. Bracket 705 is attached to base plate member 490 which pivots on axis 495. The motion of the transport assembly 425 is powered by motor 485 which include a cam arrangement to affect pivotal motion. Coins are sequentially aligned and driven by rotor 610 up track 440.

FIG. 10 depicts a schematic diagram showing different elements of the device. Central processing unit 1205 controls a number of functions including receiving signals from a credit detector 1217 which may be a coin acceptor, token acceptor, RFID tag reader, magnetic strip reader or other chip reader. Credit acceptors for amusement games are generally known in the art. If sufficient credit is detected, a credit switch 1219 is activated that allows game play to proceed. Upon activation of the credit switch 1219 a player is assigned a number of coins or tokens that may be put into play using the coin assembly transport system. Upon activation of the credit switch, the hopper motor or game piece release switch 1221 is also activated and remains activated until a predetermined number of coins that have been assigned to the player are released from the track. To release or shoot coins toward a selected area, a player activates hopper motor 1230 using control switch 1221 that causes coins to be loaded by rotor 610 into the bottom of the track thereby forcing coins out the opposite distal end that is on the horizontal arm 443. A player may maintain the switch closed and a series of coins will be sequentially ejected from the track. Alternatively, a player can press the switch once to allow a single coin to be ejected. In embodiments, the player may also activate switch 1240 that will stop the pusher motor 1234 which provides additional control and therefore provides for the additional exercise of skill. When the pusher motor is stopped, the vertical sidewalls do not move across the playfields. Otherwise, the pusher motor 1234 continuously moves vertical pushier walls 410 and 414 towards and away from the respective edges 317 and 315.

It is the object of the game to direct coins onto the playfield surface 412 when the vertical pusher wall 410 retreats and to introduce coins at a location that, when engaged by the pusher element, may cause other coins near edge 317 to fall onto the second playfield 416. Next, vertical pusher wall 414 engages any coins that have been introduced to the lower playfield area that was previously devoid of coins to potentially push other coins off edge 315.

The game device also includes a tilt sensor 1233 that is in communication with central processing unit 1205. If a tilt is detected the CPU will disable the award of credits. In embodiments, coins that drop over ledge 315 are directed to a falling coin detector 1227 and directed to a coin chute which directs coins to the collection area associated with the hopper. When play has ended, the game will distribute a number of tickets that correspond to the number of coins that were detected that fell over the edge. As discussed above, in closed loop systems, after the detections of a tilt, the CPU will not provide tickets or credits that correspond with coins that were detected by falling coin detector 1227. Closed loop systems allow for consistent operation and less maintenance that may arise from the introduction of circulated coins.

In alternative embodiments, the machine will distribute coins or tokens that have been dropped from the ledge to the player by a diversion chute. In embodiments that distribute coins as a reward, the machine further employs an access control door 1230 that may be opened or closed by the CPU. When a tilt is detected, the CPU 1205 transmits a signal to close access control door 1230 preventing access. In embodiments any coins in the access location are then directed to the coin hopper or a secure reservoir, using a second chute and control door. This feature prevents theft from the machine by tampering.

In yet a further embodiment, an access door may be opened when a prize falls through the chute that has an RFID tag on the prize and is detected by a tag reader. This feature allows for the of high value prize on the playing surface, which may comprise coins or tokens with RFID tags and indica reflecting the status or value of a coin or token having an additional bonus prize.

In yet further embodiments, a second coin hopper may distribute coins or tokens to a player access area in responses to a signal from the CPU that is correlated with the coins detected that have fallen from the edge, other bonus conditions, such as the detection of a bonus RFID tag or both. When the second hopper distributes coins or tokens, lights and a loudspeaker are activated to provide to signal to the player that a distribution through an access location has been initiated. In this regard, CPU 1205 also controls display panels 1207 and 1209 that provide graphic attraction displays as well as instructions and status of the game play. In the embodiment depicted in FIG. 10, CPU 1205 controls display 1209 which displays a game score which reflects the number of coins played as the game progresses, the number of coins that have dropped from the edge, and other game status information including the number of credits or time remaining. In embodiments, the device also includes audio speakers 1211 for sound effects and a lighting system 1213 to provide further visual display and signals.

In embodiments, the machine includes a diversion ledge and diversion channel, provided at a lateral location of the playfield that collects coins that are not distributed to the player but fall into a separate region for the machine owner. In embodiments a coin detector is provided to detect coins that fall into the diversion channel and such data can be provided to the game machine owner.

Hopper exit coin detector 1225 is provided on the exit of the hopper to count the number of coins that enter the track, and which reflects the same number of coins that a player releases or shoots from the end of the track. After the allocated number of coins that a player has been credited has been expended, the game piece release switch 1221 is deactivated.

In operation, a game player provides credit to the system which, if valid, is detected by credit detector 1217. Upon the detection of a credit, the CPU will activate credit switch 1219 and, in preferred embodiments, illuminate the credit switch and update the game status display 1209 to reflect the number of credits and or coins available to play. In embodiments, the player then may activate either the pusher control stop switch 1240 to stop the pusher movement, the transport assembly switch 1241 to stop the pivoting of the arm or both, to control the location of the introduction of the coins to the playfield 412. When the player is satisfied with the location of the pushers and horizontal arm 443, the player can activate the coin game piece release switch 1221 that activates hopper motor 1232. By keeping the switch open, the player can shoot multiple coins sequentially. Alternatively, the coin release switch 1221 can be manipulated for single shot action. After a predetermined number of coins have been the released, the coin release switch 1221 and other control switches 1240 and 1241 are deactivated. If the player has won, coins that have fallen from the ledge are calculated and the CPU issues a corresponding number of tickets or credits to the player. Alternatively, in embodiments when a player wins, as reflected by having coin fall from ledge 317, coins are directed by a second hopper to a player access area. While the terms coins and tokens are sue to described the game pieces in the embodiments are depicted, it is contemplated that other cylinder shaped pieces may be used. It is further contemplated that other game pieces may be advantageously used, such as spheres or cubes with appropriately designed hoppers for the capture, orientation and the introduction of the items into a track.

As discussed above, in embodiments, a detector is provided in association with the diverter for detecting coins that have fallen off the ledge. Coins in this way be detected immediately after they have dropped over the edge of the playing surface, and an appropriate number of prize points can be awarded to the player. In embodiments, a diverter can route coins to the shooter arm assembly in a closed loop arrangement and route items with RFID tags to a separate channel for detection of the RFID tag and then to a lift mechanism for reintroduction to the game from a position above the playfield edges. The display may be updated as coins are detected to inform the player of the status of coins or other prizes earned. Chutes that direct coins from the playfield ledge to the diverter and orient the coin in a line, and then direct the coins to the hopper or separate channels comprise inclined surfaces.

Embodiments of the invention allow for an attraction mode wherein coins are continuously or periodically ejected from the hopper, introduced to the track and the playing surface. In an attract mode, as coins are introduced they can be recycled back to the playfield surface and users, after inspection of the game conditions, may be inclined to play the game.

In further embodiments, a coin track assembly is combined with playfields that have targets comprising openings or pockets which can receive coins and coin chutes to direct the coins back to a hopper or player access areas.

The invention is not limited to the above-described embodiments and the skilled person in the art will appreciate that many modifications and variants can be envisaged within the scope of the invention, which is defined solely by the following claims.

I claim:

1. An amusement machine comprising:

a planar playing surface on which a plurality of playing pieces may be supported, a playing piece pusher element configured for reciprocating motion that moves over said playing surface to engage any playing pieces on said playing surface, wherein said playing surface further comprises a horizontal edge and said playing pieces, when engaged by said pusher element, can drop over said edge and pass to a collection location, a transport assembly for moving said playing pieces from said collection location to said playfield, said transport assembly comprising a motorized hopper and a track, said motorized hopper located below said playfield, and adapted to collect and sequentially eject said playing pieces into said track, and, said track adapted to receive said playing pieces and having a proximal end extending from said hopper and a distal end defining an exit passage, said exit passage facing said playfield, and a control switch that activates said motorized hopper and, a transport assembly motor configured to drive said transport assembly to cause it to pivot and thereby causing said track exit passage to sweep in an arc above said playfield, wherein said track exit passage further comprises a spring-biased pivotable retainer element on a distal end portion of said track wherein said retainer element holds a said playing piece in said track when in a first position, and when a said playing piece is pushed against a stop member of said retainer element, said stop member pivots to a second position to allow for the release of said playing piece from said track and when playing piece exits said track, said spring pulls said retainer back to said first position causing said stop member to engage the rear of said playing piece and propel said playing piece through said exit passage.

2. The amusement machine as recited in claim 1 wherein said hopper comprises a rotary coin hopper.

3. The amusement machine as recited in claim 1, wherein said game pieces comprise either coins, tokens or both coins and tokens, and said transport assembly is configured to circulate a plurality of said coins, tokens or both coins and tokens in a closed system.

4. The amusement machine recited in claim 3 wherein said transport assembly is attached to a base member, and said base member is linked to said transport assembly motor to provide for pivoting motion.

5. The amusement machine of recited in claim 1 wherein said distal end portion of said track is substantially horizontal.

6. The amusement machine recited in claim 1 further comprising a central controller and a first coin detector, said first coin detector configured to detect coins as they pass from said hopper to said track and to transmit a signal to said controller, said signal reflecting the number of coins passing into said track, and a player control switch to activate said hopper and cause said playing pieces to enter said proximal end of said track forcing the release of pieces from said exit passage.

7. The amusement machine recited in claim 1 further comprising a detection device to detect coins that fall from said edge, and an award device for awarding a prize that corresponds to the detected number of coins that have fallen over said edge.

8. An amusement machine of the pusher type, comprising: a playing surface on which a plurality of playing pieces may be supported, a playing piece pusher element configured for reciprocating motion that moves over said playing surface to engage any playing pieces on said playing surface, wherein said playing surface further comprises a horizontal ledge and said playing pieces, when engaged by said pusher element, can drop over said ledge of said playing surface and pass to a collection location and, a transport assembly for moving said playing pieces from said collection location to said playfield, said transport assembly comprising a hopper and a track, said hopper for collecting and sequentially ejecting said playing pieces into said track, and said track adapted to receive said playing pieces, and comprising a first track section that extends from said hopper to a second section, above said first section and that extends over said playfield, wherein said track further comprises a spring-biased pivotable retainer element on the end of said track wherein said retainer element comprises a stop member which holds said playing pieces in said track when in a first position, and when a said playing piece is pushed against a stop surface of said stop member, said stop member pivots upward to a second position to allow for the release of a playing piece from said track, said amusement machine further comprising a central controller, and player input control devices, said player input control devices comprising a player game piece release switch wherein said switch can activate said motorized hopper to cause said game pieces to be released from the end of said track.

9. The amusement machine as recited in claim 8 wherein said player control devices comprise a stop switch that allows a player to temporarily stop the motion of said pusher element.

10. The amusement game recited in claim 8 wherein said second track section is connected to a motor that causes said track section to sweep back and forth across said playfield.

11. The amusement machine as recited in claim 10 wherein said player control devices comprise a stop switch that allows a player to temporarily stop the motion of said second track section.

12. A transport assembly for moving said playing pieces from a collection location to an amusement game playfield, said transport assembly comprising a motorized hopper and a track, said motorized hopper adapted to collect and sequentially eject said playing pieces into said track, and, said track defined by a bottom wall, two side walls and top wall and said track adapted to receive said playing pieces and having a proximal end extending from said hopper and a distal end defining an exit passage, a control switch that activates said motorized hopper and, a transport assembly motor attached to said assembly and configured to drive said transport assembly to cause it to pivot and thereby causing said track exit passage to sweep in an arc wherein said track exit passage further comprises a spring-biased pivotable retainer element on the end of said track and said retainer holds said playing pieces in said track when in a first position, and when a said playing piece is pushed against a stop member of said retainer element, said stop member pivots to a second position to allow for the release of playing piece from said track and when pieces exits said track, said spring pulls said retainer back to said first position causing said stop member to engage the rear of said piece and propel said piece through said exit passage.

13. The track assembly recited in claim 12 wherein said playing pieces comprise coins, tokens or both and said track assembly is enclosed in a cabinet having a transparent window.

14. The track assembly recited in claim 12 wherein said control switch for said motorized hopper is located outside said cabinet and further comprising a second control switch located outside said cabinet that activates and deactivates said transport assembly motor.

* * * * *